(12) United States Patent
Cheng

(10) Patent No.: US 8,903,218 B2
(45) Date of Patent: *Dec. 2, 2014

(54) METHOD FOR SYNCHRONIZING AUDIO PLAYBACK OF A PLURALITY OF DIGITAL MEDIA RENDERS, AND RELATED DIGITAL MEDIA CONTROLLER AND DIGITAL AUDIO MEDIA RENDER

(71) Applicant: Primax Electronics Ltd., Taipei (TW)

(72) Inventor: Ting-Yuan Cheng, Taipei (TW)

(73) Assignee: Primax Electronics Ltd., Neihu, Taipei (TW)

( * ) Notice: Subject to any disclaimer, the term of this patent is extended or adjusted under 35 U.S.C. 154(b) by 109 days.

This patent is subject to a terminal disclaimer.

(21) Appl. No.: 13/666,976

(22) Filed: Nov. 2, 2012

(65) Prior Publication Data

US 2013/0338805 A1    Dec. 19, 2013

(30) Foreign Application Priority Data

Jun. 18, 2012 (TW) .............................. 101121779 A

(51) Int. Cl.
*H04N 5/932* (2006.01)

(52) U.S. Cl.
USPC ............................. 386/201; 386/203; 386/338

(58) Field of Classification Search
CPC ..... G11B 27/10; G06F 15/16; G06F 17/3074; G06F 3/16; G06F 3/165; H04N 21/439; H04N 5/932
USPC .......................................... 386/201, 203, 338
See application file for complete search history.

(56) References Cited

U.S. PATENT DOCUMENTS

| 5,245,667 | A  | * | 9/1993  | Lew ............................. 381/94.4 |
| 6,661,861 | B1 | * | 12/2003 | Pianka et al. .................. 375/373 |
| 6,683,927 | B1 | * | 1/2004  | Ito ................................. 375/355 |
| 2003/0118059 | A1 | * | 6/2003  | Sugahara ..................... 370/535 |
| 2006/0098936 | A1 | * | 5/2006  | Ikeda et al. ..................... 386/46 |
| 2010/0077110 | A1 | * | 3/2010  | Berreth ........................... 710/22 |
| 2011/0320214 | A1 | * | 12/2011 | Pilati et al. .................... 704/500 |
| 2012/0140018 | A1 | * | 6/2012  | Pikin et al. ................. 348/14.02 |
| 2013/0336626 | A1 | * | 12/2013 | Cheng .......................... 386/201 |

* cited by examiner

*Primary Examiner* — Helen Shibru

(74) *Attorney, Agent, or Firm* — Winston Hsu; Scott Margo

(57) ABSTRACT

A method for synchronizing audio playback of a plurality of digital media renders including a first digital audio media render and at least one second digital audio media render. The method includes: detecting a relative time difference between the first digital audio media render and the at least one second digital audio media render, and controlling audio playback of the at least one second digital audio media render according to the relative time difference, to make audio playback of the at least one second digital media render synchronized with audio playback of the first digital audio media render.

20 Claims, 10 Drawing Sheets

METHOD FOR SYNCHRONIZING AUDIO PLAYBACK OF A PLURALITY OF DIGITAL MEDIA RENDERS, AND RELATED DIGITAL MEDIA CONTROLLER AND DIGITAL AUDIO MEDIA RENDER

BACKGROUND OF THE INVENTION

1. Field of the Invention

The disclosed embodiments of the present invention relate to audio playback, and more particularly, to a method for synchronizing audio playback of a plurality of digital media renders (DMRs) and related digital media controller and digital audio media render.

2. Description of the Prior Art

An industrial standard of mutual connection and mutual adaption of products of distinct manufacturers for providing digital living to consumers is achieved by the Digital Living Network Alliance (DLNA). The DLNA specification is also employed by a home digital audio and video media playback system including a digital media controller (DMC), a digital media server (DMS), and a plurality of digital media renders (DMRs). However, in a case where the DMRs, the DMS and the DMRs are connected via wireless connections, the DMRs receive audio data from the DMS for audio playback byway of wireless connection. The advantages include simplified wired configuration and enhanced flexibility for future equipment update. However, the disadvantage is that a wireless transmission has poorer stability when compared with a wired transmission. The DMRs may be asynchronous to each other apparently at the initial condition of the playback or during the playback as the system is subject to interference. Even though the wireless connection is stable, the DMRs may be asynchronous to each other gradually due to a slight difference between DMRs' oscillator frequencies. Therefore, how to control and synchronize a plurality of DMRs has become a significant concern in this field.

Regarding the conventional design of synchronization of the DMRs, an absolute timing concept is employed. Specifically, each DMR may have information with absolute timing to comply with. However, many systems, including the DLNA system, do no offer the information about the absolute timing due to simplified system designs. As a result, the conventional synchronization method cannot be employed by these systems. Therefore, there is a need for an innovative design which can synchronize a plurality of DMRs.

SUMMARY OF THE INVENTION

In accordance with exemplary embodiments of the present invention, a method for synchronizing audio playback of multiple DMRs and related apparatuses are proposed to solve the above-mentioned problem.

According to a first aspect of the present invention, an exemplary method of synchronizing audio playback of a plurality of digital media renders (DMR) is disclosed. The DMRs include a first digital audio media render and at least one second digital audio media render. The method includes: detecting a relative time position difference between the first digital audio media render and the at least one second digital audio media render; and controlling audio playback of the at least one second digital audio media render to be synchronous to audio playback of the first digital audio media render according to the relative time position difference.

According to a second aspect of the present invention, an exemplary digital media controller (DMC) for synchronizing audio playback of a plurality of DMRs is disclosed, wherein the DMRs include a first digital audio media render and at least one second digital audio media render. The DMC includes a detecting circuit and a control circuit. The detecting circuit is arranged for detecting a relative time position difference between the first digital audio media render and the at least one second digital audio media render. The control circuit, which is connected to the detecting circuit, is arranged for controlling audio playback of the at least one second digital audio media render to be synchronous to audio playback of the first digital audio media render according to the relative time position difference.

According to a third aspect of the present invention, an exemplary digital audio media render is disclosed. The exemplary digital audio media render includes an audio playback adjusting circuit and a control circuit. The control circuit is arranged for receiving a mismatching relative time position from a DMC, and controlling the audio playback adjusting circuit according to the mismatching relative time position, wherein the mismatching relative time position corresponds to a relative time position difference between the digital audio media render and the another digital audio media render.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

In a digital media playback system, a plurality of digital media renders (DMRs) may include a plurality of digital audio media renders (e.g., a home theater or a 5.1 channel speaker system). In general applications, more than one audio render is utilized for audio playback. In some advanced applications, multiple audio renders may be integrated, or even be controlled by a digital media controller (DMC) which can transmit a digital audio data from a digital media server (DMS) to the digital audio media renders for instant playback through wireless communication. The synchronization between the digital audio media renders is difficult to maintain stable due to instability at the initial state of the transmission or instability during the transmission. Therefore, timing related information is utilized directly or indirectly to monitor the status of synchronization and correct the synchronization in a real-time manner.

Figure 1:
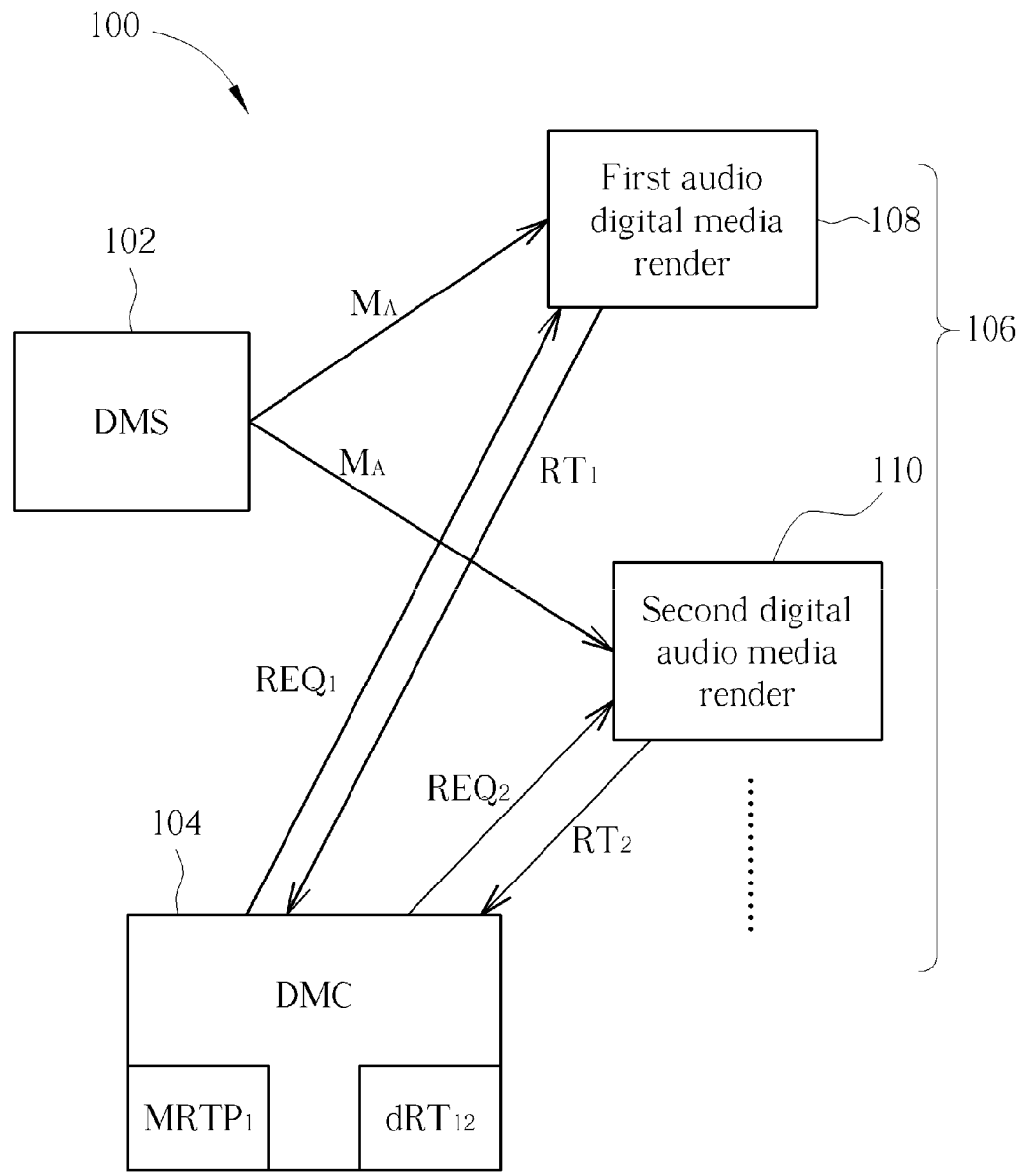
FIG. 1 is a diagram illustrating a digital media playback system according to an exemplary embodiment of the present invention.

Please refer to FIG. 1, which is a diagram illustrating a digital media playback system according to an exemplary embodiment of the present invention. In this embodiment, the exemplary digital media playback system 100 includes a digital media server (DMS) 102, a digital media controller (DMC) 104, and a plurality of digital media renders (DMRs) 106 (e.g., a first audio digital media render 108, such as a digital audio media render which is chosen to be a reference for other digital audio media render(s)) and at least one second digital audio media render 110 (e.g., digital audio media render(s) which need to perform audio playback adjustment to achieve synchronized audio playback). FIG. 1 shows only two digital audio media renders for brevity due to that the operation of synchronizing audio playback of a first digital audio media render (e.g., a single reference digital audio media render) and a second digital audio media render (e.g., a single digital audio media render with asynchronous audio playback) can be readily extended to synchronizing audio playback of a first digital audio media render (e.g., a single reference digital audio media render) and a plurality of second digital audio media renders (e.g., a plurality of digital audio media renders each having asynchronous audio playback). For simplicity, FIG. 1 only shows two digital audio media renders. In fact, the exemplary digital media playback system 100 may have more than two digital audio media renders.

The DMS 102 may transmit digital audio data $M_A$ to the first digital audio media render 108 and the second digital audio media render 110, respectively. Therefore, the first digital audio media render 108 and the second digital audio media render 110 perform the audio playback according to the digital audio data $M_A$, respectively. As mentioned above, the synchronization between the first digital audio media render 108 and the second digital audio media render 110 in the digital media playback system 100 is difficult to maintain stable due to the instability at the initial state of the transmission or the instability during the transmission. Thus, in this embodiment, the DMC 104 is properly designed to control the audio playback synchronization between the first audio media render 108 and the second digital audio media render 110.

Figure 2:
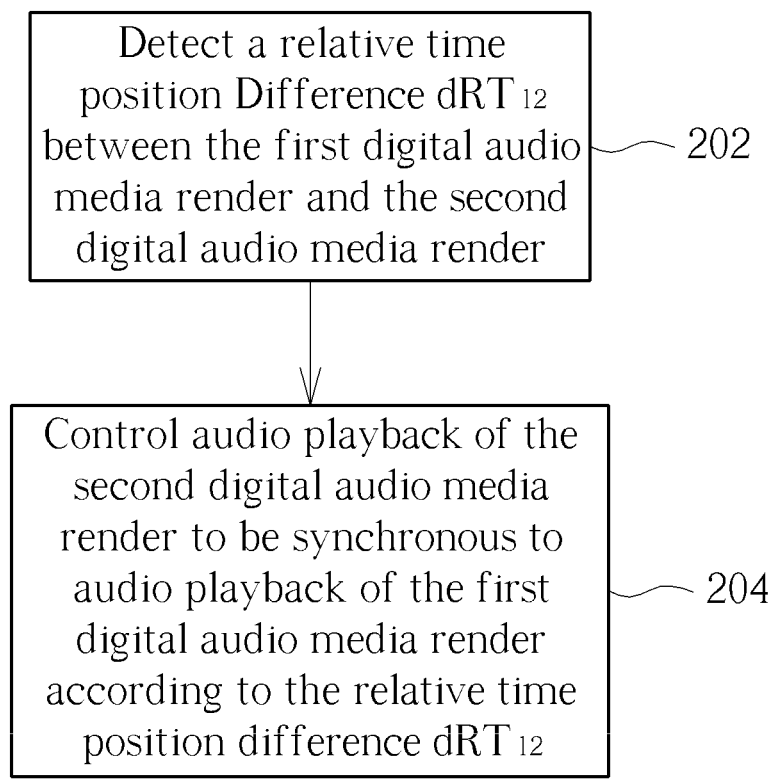
FIG. 2 is a flowchart illustrating a method for synchronizing the audio playback of the first digital audio media render and the at least one second digital audio media render according to an exemplary embodiment of the present invention.

Please refer to FIG. 2, which is a flowchart illustrating a method for synchronizing the audio playback of the first digital audio media render 108 and the at least one second digital audio media render 110 according to an exemplary embodiment of the present invention. Provided that substantially the same result is achieved, the steps of the flowchart shown in FIG. 2 need not be in the exact order shown and need not be contiguous, that is, other steps can be intermediate. Besides, some steps in FIG. 2 may be omitted according to various types of embodiments or requirements. By way of example, but not limitation, the DMC 104 may employ this method to synchronize the audio playback of the first digital audio media render 108 and the at least one second digital audio media render 110. The method may be briefly summarized as follows.

Step 202: Detect a relative time position difference $dRT_{12}$ between the first digital audio media render 108 and the second digital audio media render 110; and Step 204: Control audio playback of the second digital audio media render 110 to be synchronous to audio playback of the first digital audio media render 108 according to the relative time position difference $dRT_{12}$.

In accordance with the embodiment shown in FIG. 2, when the playback of the digital audio data $M_A$ is performed, the relative time position difference $dRT_{12}$ in step 202 is a relative time difference (i.e., asynchronization) between the first digital audio media render 108 and the second digital audio media render 110 due to some factors. By way of example, but not limitation, if the DMS 102 is connected with the second digital audio media render 110 and the first digital audio media render 108 via wireless transmission, respectively, the links would have different transmission lengths, different interference, and different channel models. That is to say, the transmission time of the digital audio data $M_A$ from the DMS 102 to the second digital audio media render 110 may be different from the transmission time of the digital audio data $M_A$ from the DMS 102 to the first digital audio media render 108. Considering another example, but not limitation, independent digital circuits are required to be employed in the DMRs 106 respectively for processing the digital audio data $M_A$ and converting it to an analog audio data for wireless transmission or other unique active functions. To put it another way, the digital circuits used in the DMRs 106 are clocked by independent clocks, respectively, and the clock sources of the independent clocks are not guaranteed to be identical to each other. Thus, after accumulated for a period of time, the frequency deviation existing between the clock sources may lead to an asynchronization issue which is easily perceived and needs to be compensated. Besides, the DMC 104 could use any feasible method to obtain the relative time position difference $dRT_{12}$. By way of example, but not limitation, the relative time position difference $dRT_{12}$ may be derived from the data, including timing hints/clues, that are respectively transmitted from the first digital audio media render 108 and the second digital audio media render 110. The detailed implementation will be described later with reference to embodiments of the present invention.

Normally, there would be a plurality of digital audio media renders (e.g., a 5.1 channel speaker system) in a digital media playback system 100. Thus, one digital audio media render would be chosen from the digital audio media renders to act as a reference digital audio media render (i.e., the above-mentioned first digital audio media render 108). In one embodiment, an arbitrary digital audio media render could be the reference digital audio media render without considering the relationship (e.g., faster playback and slower playback) between audio playbacks of the digital audio media renders.

However, in another embodiment, a digital audio media render may be determined to be the reference digital audio media render by considering the relationship (e.g., faster playback and slower playback) between audio playbacks of the digital audio media renders. For instance, a digital audio media render has a largest audio relative time position (i.e., the digital audio media render with the fastest audio playback compared with other digital audio media renders) between a plurality of digital audio media renders. In other words, among a plurality of digital audio media renders, the above-mentioned first audio media render 108 has the largest audio relative time position. Hence, the audio data currently played by the first digital audio media render 108 is not played by the second digital audio media render 110 yet.

The audio playback of the first digital audio media render 108 is considered as a main reference in the digital media playback system 100 (in other words, the status of the first digital audio media render 108 would be taken as a reference for other digital audio media renders) to synchronize audio playback of a plurality of digital media renders. Therefore, the audio playback of the second digital audio media render 110 is controlled according to the relative time position difference $dRT_{12}$ to follow the audio playback of the first digital audio media render 108, thus making the audio playback of the second digital audio media render 110 synchronous to the audio playback of the first digital audio media render 108 as shown in step 204. In this way, the status of the asynchronous audio playback between the first digital audio media render 108 and the second digital audio media render 110 is obtained through the relative time position difference $dRT_{12}$, and then the speed of the audio playback may be adjusted to be faster or slower according to the relative time position difference $dRT_{12}$.

Figure 3:
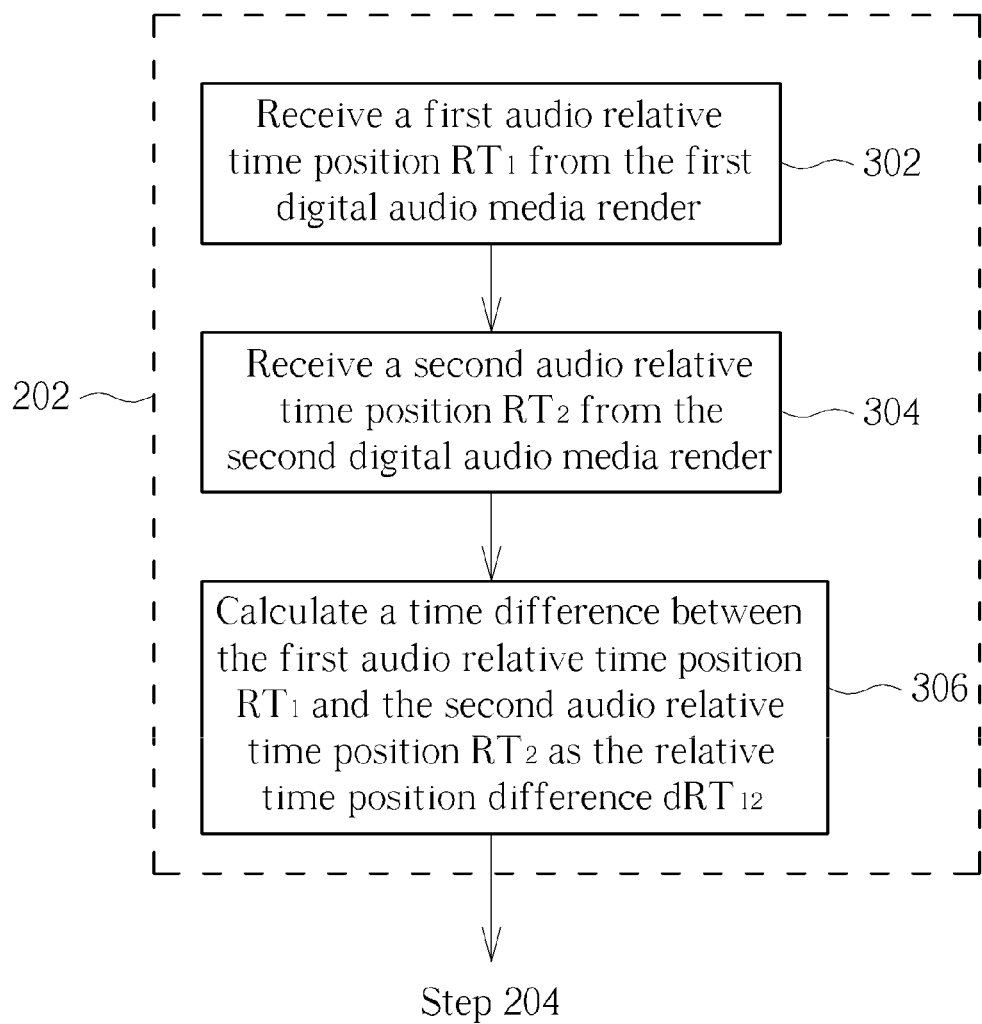
FIG. 3 is a diagram illustrating an embodiment of the step 202 shown in FIG. 2 according to the present invention.

Please refer to FIG. 3, which is a diagram illustrating an embodiment of the step 202 shown in FIG. 2 according to the present invention. Provided that substantially the same result is achieved, the steps of the flowchart shown in FIG. 3 need not be in the exact order shown and need not be contiguous, that is, other steps can be intermediate. Besides, some steps in FIG. 3 may be omitted according to various types of embodiments or requirements. In this embodiment, the detailed operation of the step 202 may include following steps.

Step 302: Receive a first audio relative time position $RT_1$ from the first digital audio media render 108;

Step 304: Receive a second audio relative time position $RT_2$ from the second digital audio media render 110; and Step 306: Calculate a time difference between the first audio relative time position $RT_1$ and the second audio relative time position $RT_2$ as the relative time position difference $dRT_{12}$.

Please note that the first audio relative time position $RT_1$ in the step 302 is transmitted from the first digital audio media render 108 to the DMC 104, where the first audio relative time position $RT_1$ is transmitted in response to a request $REQ_1$ actively sent to the first digital audio media render 108 from the DMC 104, or the first audio relative time position $RT_1$ is actively transmitted by the first digital audio media render 108 periodically. However, this is for illustrative purposes only, and is not meant to be a limitation of the present invention. Besides, the first audio relative time position $RT_1$ may include information of the length of the digital audio data $M_A$ and the time position of the current audio playback. Similarly, the second audio relative time position $RT_2$ in the step 304 also includes the same information. Thus, the second digital audio media render 110 outputs the second audio relative time position $RT_2$ in response to the request $REQ_2$, or actively outputs the second audio relative time position $RT_2$ periodically. The time difference between the first audio relative time position $RT_1$ and the second audio relative time position $RT_2$ is used as the relative time position difference $dRT_{12}$, and the objective of the synchronization process is to reduce the time difference between the first audio relative time position $RT_1$ and the second audio relative time position $RT_2$ to zero. To put it another way, the objective of the synchronization process is to reduce the relative time position difference $dRT_{12}$ to zero.

Figure 4:
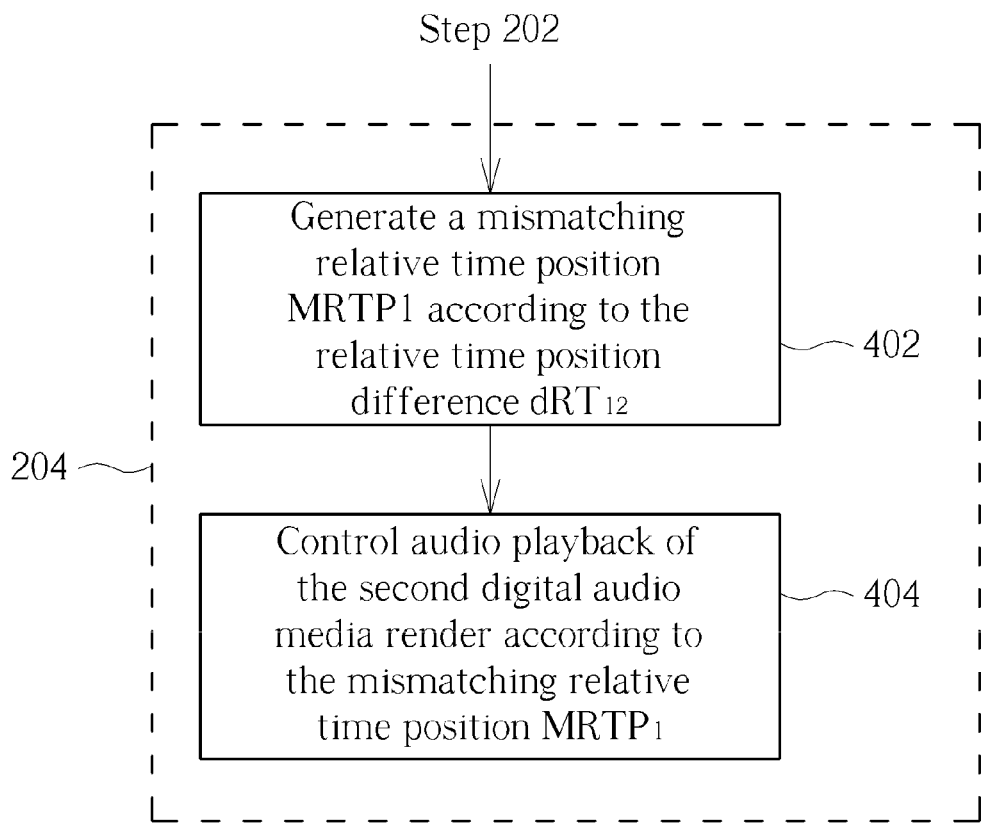
FIG. 4 is a diagram illustrating an embodiment of the step 204 according to the present invention.

Please refer to FIG. 4, which is a diagram illustrating an embodiment of the step 204 shown in FIG. 2 according to the present invention. Provided that substantially the same result is achieved, the steps of the flowchart shown in FIG. 4 need not be in the exact order shown and need not be contiguous, that is, other steps can be intermediate. Besides, some steps in FIG. 4 may be omitted according to various types of embodiments or requirements. In this embodiment, the detailed operation of the step 204 may include following steps.

Step 402: Generate a mismatching relative time position $MRTP_1$ according to the relative time position difference $dRT_{12}$; and Step 404: Control audio playback of the second digital audio media render 110 according to the mismatching relative time position $MRTP_1$.

In an embodiment of the present invention, the DMC 104 generates a mismatching relative time position $MRTP_1$ according to the relative time position difference $dRT_{12}$, where the mismatching relative time position $MRTP_1$ is used to control the audio playback of the second digital audio media render 110. Therefore, the mismatching relative time position $MRTP_1$ in the step 402 is obtained through computation on the relative time position difference $dRT_{12}$. The detailed implementation is described later. Besides, as shown in step 404, the DMC 104 controls the audio playback of the second digital audio media render 110 to be synchronous to the audio playback of the first digital audio media render 108 according to the mismatching relative time position $MRTP_1$.

Figure 5:
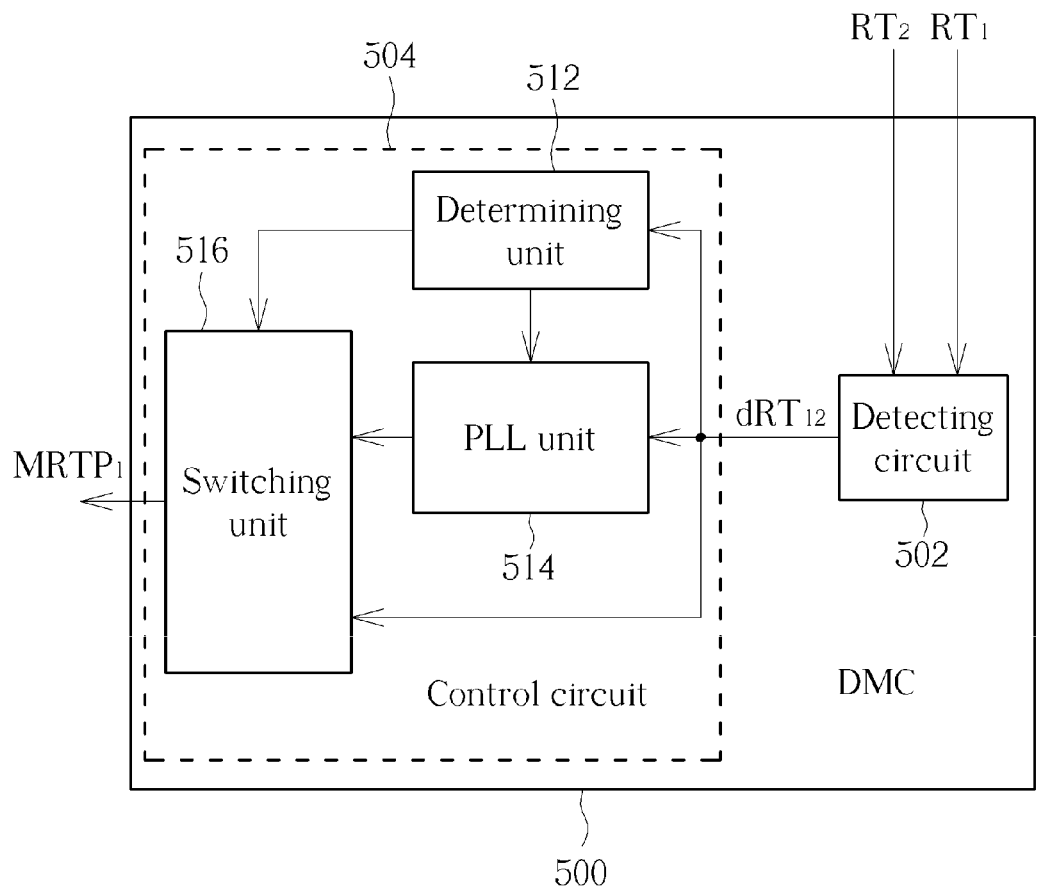
FIG. 5 is a block diagram illustrating an embodiment of the digital media controller shown in FIG. 1 according to the present invention.

Please refer to FIG. 5, which is a block diagram illustrating an embodiment of the DMC 104 shown in FIG. 1 according to the present invention. The DMC 104 may be implemented using a DMC 500. The DMC 500 is used to synchronize audio playback of a plurality of DMRs (e.g., the first digital audio media render 108 and the second digital audio media render 110). As shown in FIG. 5, the DMC 500 includes a detecting circuit 502, and a control circuit 504 coupled to the detecting circuit 502, wherein the detecting circuit 502 is arranged to perform the aforementioned step 202, and the control circuit 504 is arranged to perform the aforementioned step 204. To put it another way, the detecting circuit 502 is used to detect the relative time position difference $dRT_{12}$ between the first audio relative time position $RT_1$ of the first digital audio media render 108 and the second audio relative time position $RT_2$ of the second digital audio media render 110. And the control circuit 504 is used to output the mismatching relative time position $MRTP_1$ according to the relative time position difference $dRT_{12}$ to control the audio playback of the second digital audio media render 110, thus ensuring that the audio playback of the second digital audio media render 110 is synchronous to the audio playback of the first digital audio media render 108. In this embodiment, the control circuit 504 includes a determining unit 512, a phase-locked loop (PLL) unit 514, and a switching unit 516, wherein the detecting circuit 502 is coupled to the determining unit 512, the PLL unit 514, and the switching unit 516, respectively, and the determining unit 512 is coupled to the PLL unit 514 and the switching unit 516, respectively. The control circuit 504 may adopt the method shown in FIG. 6 to obtain the mismatching relative time position $MRTP_1$.

Figure 6:
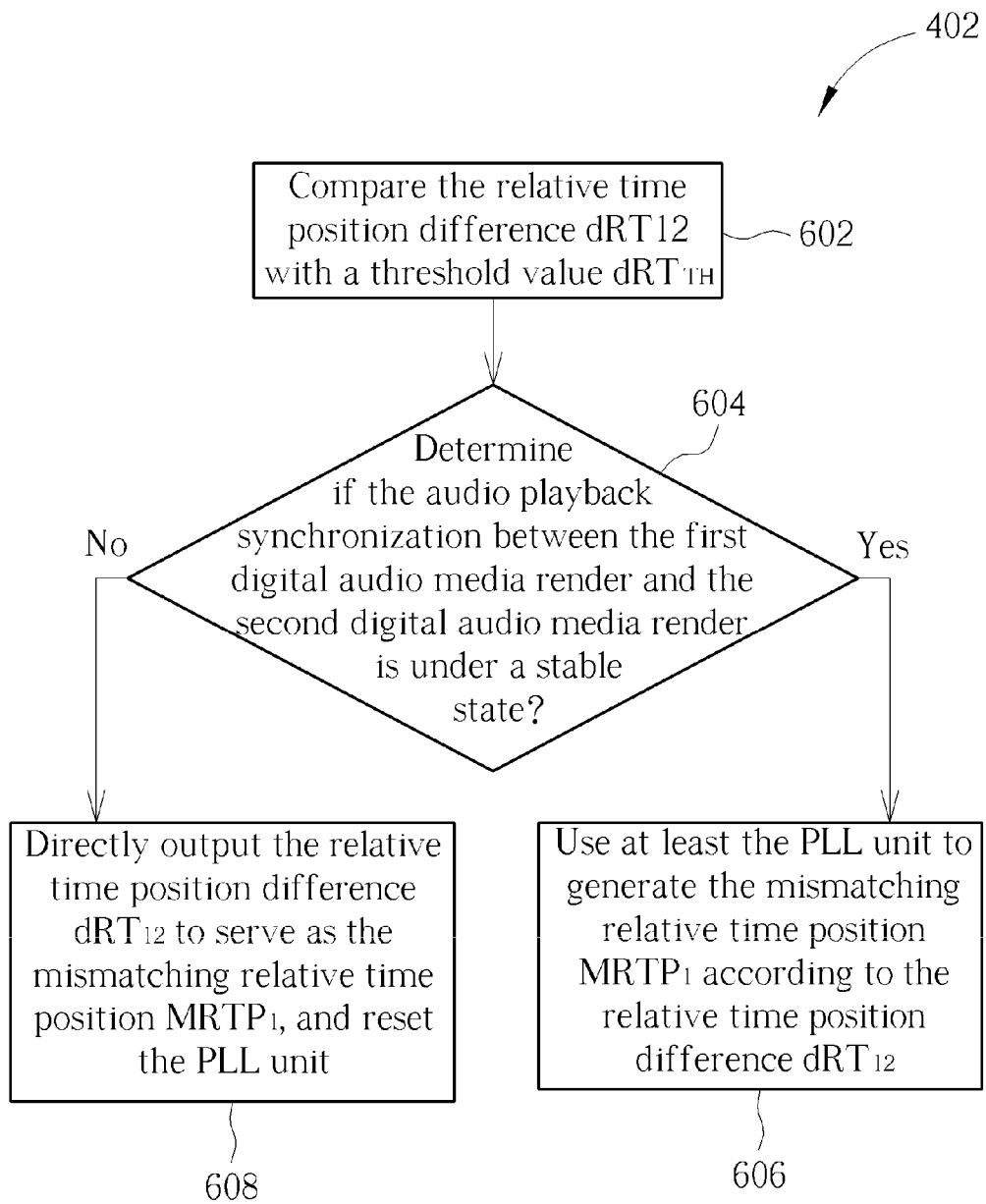
FIG. 6 is a flowchart illustrating an embodiment of the step 402 shown in FIG. 4 according to the present invention.

Please refer to FIG. 6 in conjunction with FIG. 5. FIG. 6 is a flowchart illustrating an embodiment of the step 402 shown in FIG. 4 according to the present invention. Provided that substantially the same result is achieved, the steps of the flowchart shown in FIG. 6 need not be in the exact order shown and need not be contiguous, that is, other steps can be intermediate. Besides, some steps in FIG. 6 may be omitted according to various types of embodiments or requirements. In this embodiment, the detailed operation of the step 402 may include following steps.

Step 602: Compare the relative time position difference $dRT_{12}$ with a threshold value $dRT_{TH}$;

Step 604: Determine if the audio playback synchronization between the first digital audio media render 108 and the second digital audio media render 110 is under a stable state. When the relative time position difference $dRT_{12}$ is less than the threshold value $dRT_{TH}$, it is determined that the audio playback synchronization is under the stable state; and when the relative time position difference is not less than the threshold value $dRT_{TH}$, it is determined that the audio playback synchronization is not under the stable state.

Step 606: Use at least the PLL unit 514 to generate the mismatching relative time position $MRTP_1$ according to the relative time position difference $dRT_{12}$; and Step 608: Directly output the relative time position difference $dRT_{12}$ to serve as the mismatching relative time position $MRTP_1$, and reset the PLL unit 514.

The determining unit 512 performs steps 602 and 604 to determine if the audio playback synchronization between the first digital audio media render 108 and the second digital audio media render 110 is under a stable state or not, and the switching unit 516 selectively chooses the output of the PLL unit 514 (step 606) or the output of the detecting circuit 502 (step 608) as the mismatching relative time position $MRTP_1$. It should be noted that the detecting result of the steps 602 and 604 is used for distinguishing between two processing methods of the relative time position difference $dRT_{12}$. Generally speaking, a large relative time position difference $dRT_{12}$ between the first digital audio media render 108 and the second digital audio media render 110 may occur at the initial state of the link or may be induced by the reconnection due to the disconnection caused by the poor signal quality. Under the condition where there is a normal link with continuous transmission, the relative time position difference $dRT_{12}$ is usually with small variation. In accordance with the aforementioned determination mechanism, under a stable synchronization condition, the causes which induce the relative time position difference $dRT_{12}$ may include a minor factor such as irregular small variation caused by clock jitter and random noise and a major factor such as a relative time position difference resulting from continuous accumulation of the frequency difference of clock sources of the first digital audio media render 108 and the second digital audio media render 110. The relative time position difference $dRT_{12}$ increases in a slow and linear way, and finally reaches a level that the user or audience can feel the audio playback asynchronization. Furthermore, the range of variation of the relative time position difference $dRT_{12}$ is not wide, and it is difficult to distinguish between the irregular minor variation induced by clock jitter and random noise and the regular variation induced by frequency deviation in a short time. Therefore, to avoid system instability, the relative time position difference $dRT_{12}$ needs to be pre-processed before used. In this exemplary embodiment, the relative time position difference $dRT_{12}$ acts as a phase error and is fed into the PLL unit 514 to track the clock of the first digital audio media render 108 (step 606). However, if the audio playback synchronization is not under the stable state, immediately compensation is required because the relative time position difference $dRT_{12}$ is usually unpredictable and large. Thus, the switching unit 516 directly outputs the relative time position difference $dRT_{12}$ to serve as the mismatching relative time position $MRTP_1$, and the determining unit 512 would reset the PLL unit 514 (step 608).

It should be noted that the method to determine if the audio playback synchronization between the first digital audio media render 108 and the second digital audio render 110 is stable or not is not limited to the steps in FIG. 6, and the threshold $dRT_{TH}$ in step 602 may be configured according to different operating environments or applications. Moreover, the threshold $dRT_{TH}$ may be an adaptive value (e.g., auto-configurable in accordance with the operating environment). The aforementioned designs are all belong to the scope of the present invention.

Besides, one control circuit 504 processes only one relative time position difference $dRT_{12}$. Therefore, regarding the DMC 500 shown in FIG. 5, it is suitable for a system with one first digital audio media render and a single second digital audio media render. However, the DMC 500 can be applied to a system with M digital audio media renders through proper modification to thereby extend the design to M corresponding control circuits. In this way, the DMC 500 outputs the mismatching relative time positions $MRTP_1$, $MRTP_2$, . . . , $MRTP_M$ according to the corresponding relative time positions difference $dRT_{11}$, $dRT_{21}$, . . . , $dRT_{M1}$, respectively.

Figure 7:
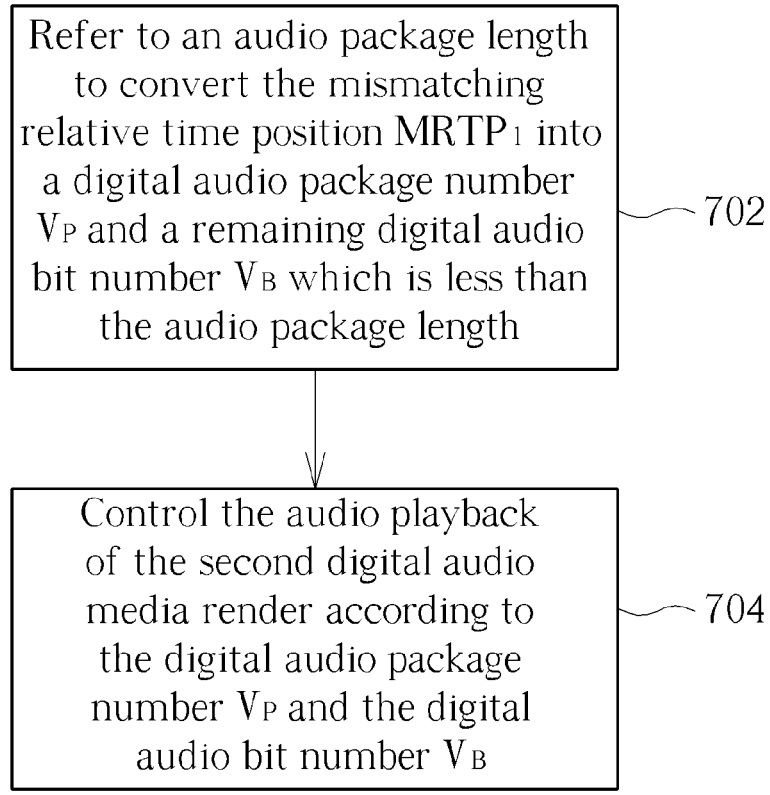
FIG. 7 is a flowchart illustrating a method for controlling the audio playback of the second digital audio media render by referring to the mismatching relative time position according to an exemplary embodiment of the present invention.

In this exemplary embodiment, the DMC 104/500 outputs the mismatching relative time position $MRTP_1$ to the second digital audio media render 110 to control the audio playback. In other words, the audio playback of the second digital audio media render 110 is adjusted based on the mismatching relative time position $MRTP_1$. Please refer to FIG. 7, which is a flowchart illustrating a method for controlling the audio playback of the second digital audio media render 110 by referring to the mismatching relative time position $MRTP_1$ according to an exemplary embodiment of the present invention. Provided that substantially the same result is achieved, the steps of the flowchart shown in FIG. 7 need not be in the exact order shown and need not be contiguous, that is, other steps can be intermediate. Besides, some steps in FIG. 7 may be omitted according to various types of embodiments or requirements. In this embodiment, the method for controlling the audio playback of the second digital audio media render 110 may include following steps.

Step 702: Refer to an audio package length to convert the mismatching relative time position $MRTP_1$ into a digital audio package number $V_P$ and a remaining digital audio bit number $V_B$ which is less than the audio package length; and Step 704: Control the audio playback of the second digital audio media render 110 according to the digital audio package number $V_P$ and the digital audio bit number $V_B$.

The operation of synchronizing the audio playback of the first digital audio media render 108 and audio playback of the second digital audio media render 110 is to ensure that the first digital audio media render 108 and the second digital audio media render 110 play the same time position of the digital audio data $M_A$ at the same time. In other words, the first digital audio media render 108 and the second digital audio media render 110 should be guaranteed to play the same bit of the same audio package at every moment while the system is in a stable state. Therefore, in order to process the synchronization of the second digital audio media render 110 according to two different length units, step 702 refers to an audio package length to convert the mismatching relative time position $MRTP_1$ into a digital audio package number $V_P$ and a digital audio bit number $V_B$ which is less than the audio package length. If the digital audio package number $V_P$ and the digital audio bit number $V_B$ are both nonzero, the digital audio package number $V_P$ may affect the second digital audio media render 110 by using a package as one adjustment unit, and the digital audio bit number $V_B$ may affect the second digital audio media render 110 by using a bit as one adjustment unit; if the digital audio package number $V_P$ is nonzero and the digital audio bit number $V_B$ is zero, the digital audio package number $V_P$ may affect the second digital audio media render 110 by using a package as one adjustment unit; if the digital audio package number $V_P$ is zero and the digital audio bit number $V_B$ is nonzero, the digital audio bit number $V_B$ may affect the second digital audio media render 110 by using a bit as one adjustment unit.

In an exemplary implementation, the second digital audio media render 110 generates the digital audio package number $V_P$ and the digital audio bit number $V_B$ (step 702), and the audio playback control of the second digital audio media render 110 is performed by internal components of the second digital audio media render 110 (step 704). Further details are described as below.

Figure 8:
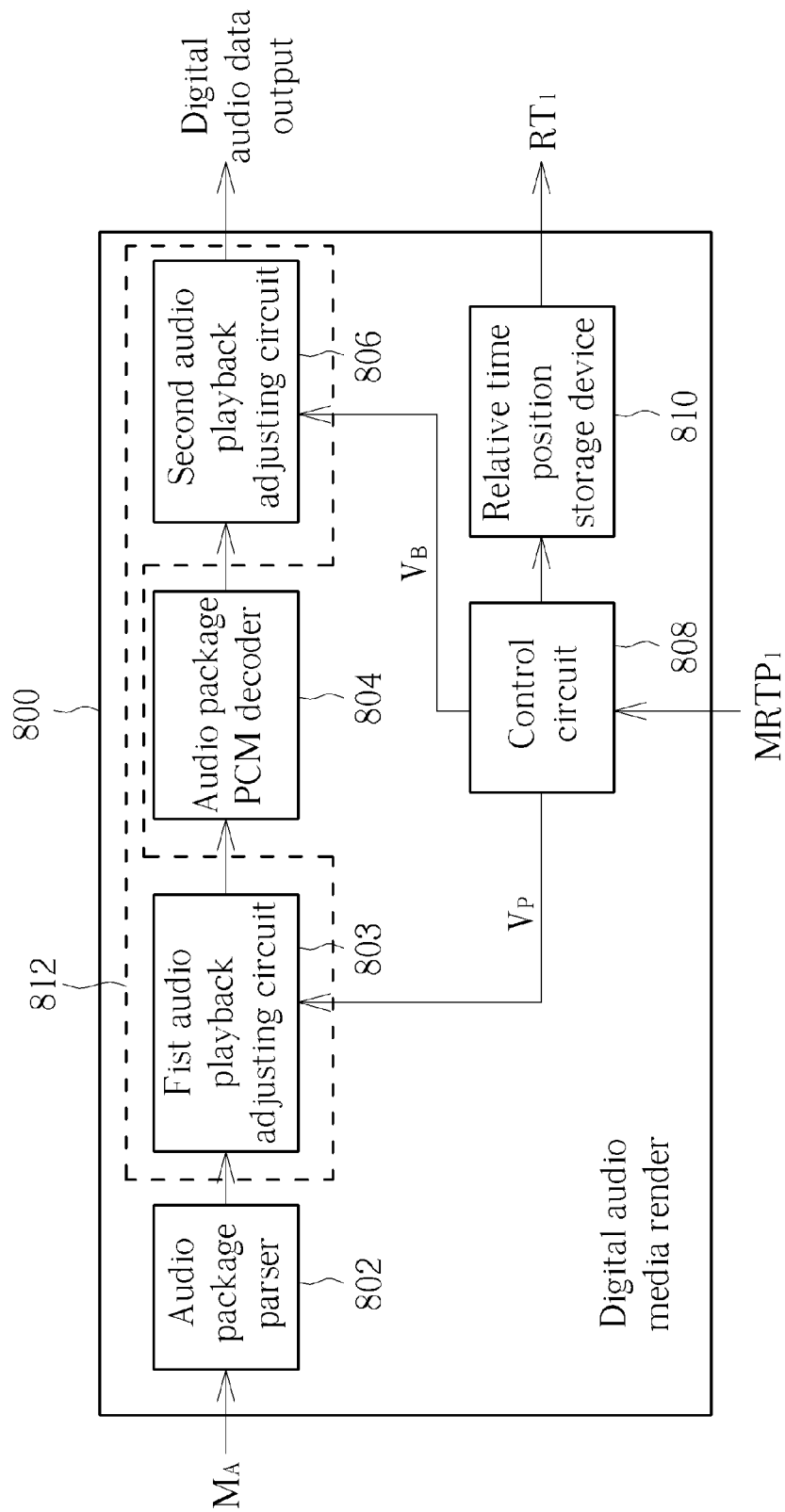
FIG. 8 is a diagram illustrating a first embodiment of the second digital audio media render shown in FIG. 1 according to the present invention.

Please refer to FIG. 8, which is a diagram illustrating a first embodiment of the second digital audio media render 110 shown in FIG. 1 according to the present invention. The second digital audio media render 110 may be implemented using a digital audio media render 800. In this exemplary embodiment, the digital audio media render 800 includes an audio package parser 802, a first audio playback adjusting circuit (e.g., an audio package skip controller) 803, an audio package pulse-code modulation (PCM) decoder 804, a second audio playback adjusting circuit (e.g., a block PCM data shift controller) 806, a control circuit 808, and a relative time position storage device (e.g., a memory) 810. The first audio playback adjusting circuit 803 and the second audio playback adjusting circuit 806 form an audio playback adjusting circuit 812 of the digital audio media render 800. The audio package parser 802 receives a digital audio data input (e.g., the digital audio data $M_A$ obtained from the DMS 102), and feeds parsed packages to the first audio playback adjusting circuit 803. The packages outputted from the first audio playback adjusting circuit 803 would be fed into the audio package PCM decoder 804 to convert the packages into raw data (i.e., the PCM data) which is then fed into the second audio playback adjusting circuit 806. Furthermore, the first audio playback adjusting circuit 803 and the second audio playback adjusting circuit 806 are controlled by the control circuit 808 to make the audio playback of the digital audio media render 800 synchronous to the audio playback of the first digital audio media render 108, wherein the control circuit 808 receives the mismatching relative time position $MRTP_1$ from the DMC 140/500, and refers to an audio package length to convert the mismatching relative time position $MRTP_1$ into a digital audio package number $V_P$ and a remaining digital audio bit number $V_B$ which is less than the audio package length. In this exemplary embodiment, the digital audio bit number $V_B$ is fed into the second audio playback adjusting circuit 806 to adjust decoded audio data bits generated by the audio package PCM decoder 804, and the digital audio package number $V_P$ is fed into the first audio playback adjusting circuit 803 to adjust the audio packages to be decoded by the audio package PCM decoder 804. In addition, the control circuit 808 further updates the audio playback relative time position $RT_1$ of the digital audio media render 800 according to the mismatching relative time position $MRTP_1$.

In this embodiment, the first audio playback adjusting circuit 803 could adjust the audio playback of the digital audio media render 800 by skipping audio packages (i.e., speeding up the audio playback), while the second audio playback adjusting circuit 806 in the digital audio media render 800 could adjust the audio playback of the digital audio media render 800 by skipping the audio data bits decoded by the audio package decoder 804 (i.e., speeding up the audio playback) or adding the new audio data bits, each having the logic value '0', to the audio data bits decoded by the audio package decoder 804 (i.e., slowing down the audio playback).

As mentioned above, the mismatching relative time position $MRTP_1$ is converted into the digital audio package number $V_P$ and the digital audio bit number $V_B$. That is to say, two components with different unit levels are utilized to adjust the digital audio media render 800 to obtain two features, including fast synchronization and stable synchronization. To put it another way, a coarse-tuning component and a fine-tuning component are used for controlling the audio playback of the digital audio media render 800. The coarse-tuning component (i.e., the digital audio package number $V_P$) is fed into the first audio playback adjusting circuit 803 to adjust the position of the audio playback by using a package as one adjustment unit, and the fine-tuning component (i.e., the digital audio bit number $V_B$) is fed into the second audio playback adjusting circuit 806 to adjust the position of the audio playback by using a bit as one adjustment unit. However, when the first audio playback adjusting circuit 803 processes synchronization by skipping audio packets, the digital audio media render 800 may be temporarily set to a silence mode since the change is significant, thereby preventing the user to perceive the uncomfortable audio playback. However, when the digital audio media render 800 in a stable state adjusts the position of the audio playback by using a bit as one adjustment unit, the digital audio media render 800 does not need to enter the salience mode since the change is hard to perceive.

Figure 9:
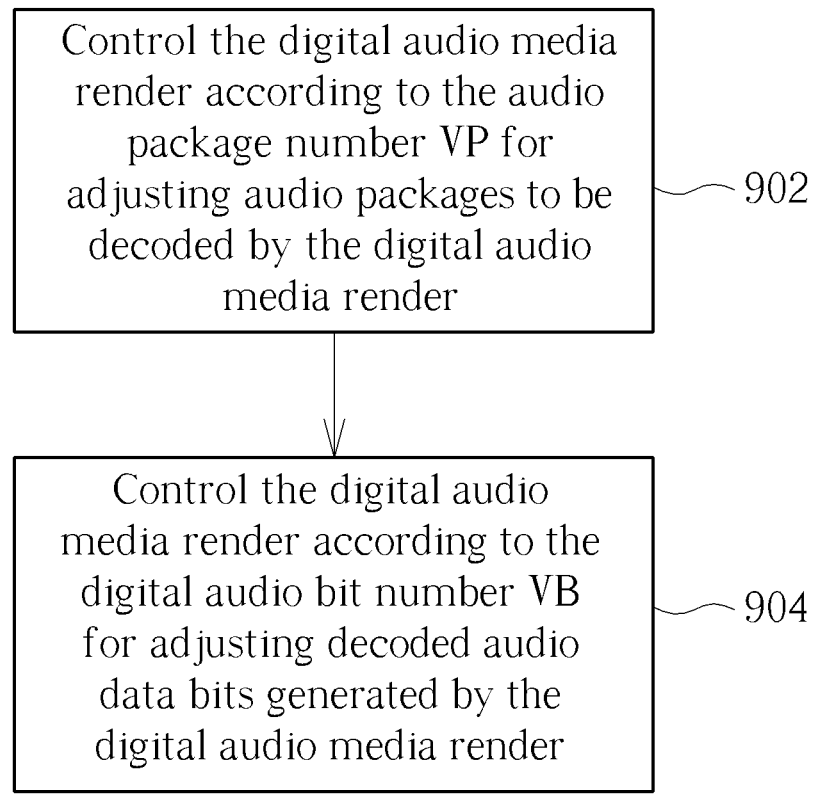
FIG. 9 is a flowchart illustrating a method for controlling the audio playback of the digital audio media render by referring to the digital audio package number and the digital audio bit number according to an embodiment of the present invention.

Please refer to FIG. 9, which is a flowchart illustrating a method for controlling the audio playback of the digital audio media render by referring to the digital audio package number and the digital audio bit number according to an embodiment of the present invention. Provided that substantially the same result is achieved, the steps of the flowchart shown in FIG. 9 need not be in the exact order shown and need not be contiguous, that is, other steps can be intermediate. Besides, some steps in FIG. 9 may be omitted according to various types of embodiments or requirements. In this embodiment, the method for controlling the audio playback of the digital audio media render may include following steps.

Step 902: Control the digital audio media render according to the audio package number $V_P$ for adjusting audio packages to be decoded by the digital audio media render; and Step 904: Control the digital audio media render according to the digital audio bit number $V_B$ for adjusting decoded audio data bits generated by the digital audio media render.

As a person skilled in the art can readily understand operations of the steps shown in FIG. 9 after reading above paragraphs, further description is omitted here for brevity.

Please note that, converting the mismatching relative time position $MRTP_1$ into a digital audio package number $V_P$ and a digital audio bit number $V_B$ is only one of the feasible synchronization methods, and is not a limitation of the present invention. For instance, the mismatching relative time position $MRTP_1$ may be directly used to control the audio playback of the digital audio media render when the mismatching relative time position $MRTP_1$ is a small value. Please refer to FIG. 10, which is a diagram illustrating a second embodiment of the second digital audio media render 110 shown in FIG. 1 according to the present invention. The second digital audio media render 110 may be implemented using a digital audio media render 1000. In this exemplary embodiment, the digital audio media render 1000 includes the aforementioned audio package parser 802, audio package decoder 804, second audio playback adjusting circuit 806 and relative time position storage device 810, and further includes a control circuit 1002. The second audio playback adjusting circuit 806 form the audio playback adjusting circuit in the digital audio media render 1000. The control circuit 1002 would output the mismatching relative time position $MRTP_1$ directly to control the second audio playback adjusting circuit 806, thereby making the audio playback of the digital audio media render 1000 synchronous to the audio playback of the first digital audio media render 108. This alternative design also belongs to the scope of the present invention.

Figure 10:
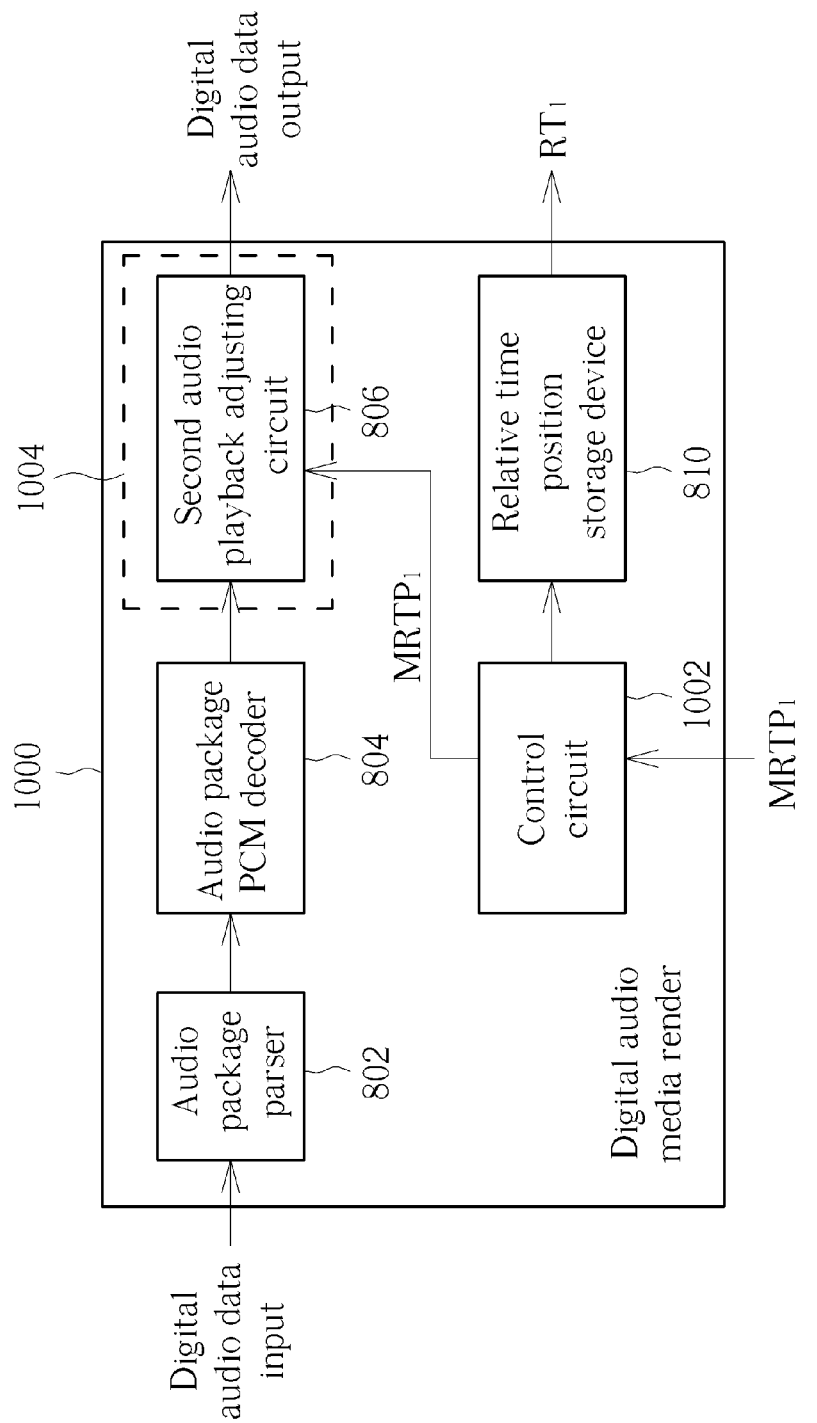
FIG. 10 is a diagram illustrating a second embodiment of the second digital audio media render shown in FIG. 1 according to the present invention.

In the digital audio media renders shown in FIG. 8 and FIG. 10, the control circuit 808/1002 updates the audio playback relative time position $RT_1$ recorded in the relative time position storage device 810 according to the mismatching relative time position $MRTP_1$, wherein the mismatching relative time position $MRTP_1$ is derived from the relative time position difference $dRT_{12}$, and the relative time position difference $dRT_{12}$ is derived from the audio playback relative time position $RT_1$. To put it another way, the mismatching relative time position $MRTP_1$ is derived from the audio playback relative time position $RT_1$. Therefore, when the mismatching relative time position $MRTP_1$ is used to adjust the audio playback of the digital audio media render, the audio playback relative time position $RT_1$ needs to be simultaneously updated based on the value of the adjustment to avoid the digital audio media render from being adjusted or compensated repeatedly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of synchronizing audio playback of a plurality of digital media renders (DMRs), wherein the DMRs comprise a first digital audio media render and at least one second digital audio media render, the method comprising:
    detecting a relative time position difference between the first digital audio media render and the at least one second digital audio media render;
    generating a mismatching relative time position according to the relative time position difference, comprising:
        determining if audio playback synchronization between the first digital audio media render and the at least one second digital audio media render is under a stable state; and
        when the audio playback synchronization is under the stable state, providing the relative time position difference, acting as a phase error needs to be eliminated, to at least a phase-locked loop (PLL) unit to generate the mismatching relative time position; and
    controlling audio playback of the at least one second digital audio media render to be synchronous to audio playback of the first digital audio media render according to the mismatching relative time position.

2. The method of claim 1, wherein the DMRs receive audio data from a digital media server (DMS) for audio playback via wireless connection.

3. The method of claim 1, wherein the step of detecting the relative time position difference comprises:
    receiving a first audio relative time position from the first digital audio media render;
    receiving a second audio relative time position from the at least one digital audio media render; and
    calculating a time difference between the first audio relative time position and the second audio relative time position as the relative time position difference.

4. The method of claim 1, wherein the step of generating the mismatching relative time position further comprises:
    when the audio playback synchronization is not under the stable state, directly outputting the relative time position difference to serve as the mismatching relative time position, and resetting the PLL unit.

5. The method of claim 1, wherein the step of determining if the audio playback synchronization between the first digital audio media render and the at least one second digital audio media render is under the stable state comprises:
    comparing the relative time position difference with a threshold value;
    when the relative time position difference is less than the threshold value, determining that the audio playback synchronization is under the stable state; and
    when the relative time position difference is not less than the threshold value, determining that the audio playback synchronization is not under the stable state.

6. The method of claim 1, wherein the step of controlling the audio playback of the at least one second digital audio media render according to the mismatching relative time position comprises:
    Referring to an audio package length to convert the mismatching relative time position into an audio package number and a remaining audio bit number which is less than the audio package length; and
    controlling the audio playback of the at least one second digital audio media render according to the audio package number and the remaining audio bit number.

7. The method of claim 6, wherein the step of controlling the audio playback of the at least one second digital audio media render according to the audio package number and the remaining audio bit number comprises:
    controlling the at least one second digital audio media render according to the audio package number for adjusting audio packages to be decoded by the at least one second digital audio media render; and
    controlling the at least one second digital audio media render according to the remaining audio bit number for adjusting decoded audio data bits generated by the at least one second digital audio media render.

8. The method of claim 1, wherein the step of controlling the audio playback of the at least one second digital audio media render according to the mismatching relative time position comprises:
    controlling the at least one second digital audio media render according to the mismatching relative time position for adjusting audio data bits decoded by the at least one second digital audio media render.

9. The method of claim 1, wherein the step of controlling the audio playback of the at least one second digital audio media render according to the mismatching relative time position comprises:
    updating an audio relative time position of the at least one second digital audio media render according to the mismatching relative time position.

10. The method of claim 1, wherein the first digital audio media render has a largest audio relative time position among the DMRs.

11. A digital media controller (DMC) for synchronizing audio playback of a plurality of digital media controllers (DMRs), wherein the DMRs comprise a first digital audio media render and at least one second digital audio media render, the DMC comprising:

a detecting circuit, arranged for detecting a relative time position difference between the first digital audio media render and the at least one second digital audio media render; and a control circuit, which is coupled to the detecting circuit, arranged for controlling audio playback of the at least one second digital audio media render to be synchronous to audio playback of the first digital audio media render according to the mismatching relative time position, the control circuit comprising:

a determining unit, arranged for determining if audio playback synchronization between the first digital audio media render and the at least one second digital audio media render is under a stable state;

a phase-locked loop (PLL) unit, arranged for generating the mismatching relative time position by receiving the relative time position difference to act as a phase error needs to be eliminated; and a switching unit, coupled to the determining unit and the PLL unit, the switching unit arranged for outputting the mismatching relative time position generated from the PLL unit when the determining unit determines that the audio playback synchronization is under the stable state.

12. The DMC of claim 11, wherein the detecting circuit receives a first audio relative time position from the first digital audio media render, and receives a second audio relative time position from the at least one second digital audio media render, and calculates a time difference between the first audio relative time position and the second audio relative time position as the relative time position difference.

13. The DMC of claim 11, wherein when the determining unit determines that the audio playback synchronization is not under the stable state, the PLL unit is reset; and the switching unit is further arranged for directly outputting the relative time position difference to serve as the mismatching relative time position when the determining unit determines that the audio playback synchronization is not under the stable state.

14. The DMC of claim 11, wherein the determining unit compares the relative time position difference with a threshold value; when the relative time position difference is less than the threshold value, the determining unit determines that the audio playback synchronization is under the stable state; and when the relative time position difference is not less than the threshold value, the determining unit determines that the audio playback synchronization is not under the stable state.

15. The DMC of claim 11, wherein the first digital audio media render has a largest audio relative time position among the DMRs.

16. A digital audio media render, comprising:

an audio playback adjusting circuit; and a control circuit, arranged for receiving a mismatching relative time position from a digital media controller (DMC), referring to an audio package length to convert the mismatching relative time position into an audio package number and a remaining audio bit number which is less than the audio package length; and controls the audio playback adjusting circuit according to the audio package number and the remaining audio bit number, to make audio playback of the digital audio media render synchronous to audio playback of another digital audio media render, wherein the mismatching relative time position corresponds to a relative time position difference between the digital audio media render and the another digital audio media render.

17. The digital audio media render of claim 16, wherein the digital audio media render receives audio data from a digital media server (DMS) for audio playback via wireless connection.

18. The digital audio media render of claim 16, wherein the audio playback adjusting circuit adjusts audio packages to be decoded by the digital audio media render according to the audio package number, and adjusts decoded audio data bits generated by the digital audio media render according to the remaining audio bit number.

19. The digital audio media render of claim 16, wherein the control circuit controls the digital audio media render according to the mismatching relative time position for adjusting decoded audio data bits generated by the digital audio media render.

20. The digital audio media render of claim 16, wherein the control circuit updates an audio relative time position of the digital audio media render according to the mismatching relative time position.

* * * * *